Patented Feb. 28, 1950

2,498,694

UNITED STATES PATENT OFFICE 2,498,694

PREPARATION OF AQUEOUS DISPERSIONS BY POLYMERIZATION IN THE PRESENCE OF AMMONIUM ALGINATE

William C. Mast, Philadelphia, Pa., assignor to the United States of America as represented by the Secretary of Agriculture No Drawing. Application August 24, 1945, Serial No. 612,522

4 Claims. (Cl. 260—85.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to improvements in the manufacture of resin dispersions, including emulsions, of polymerization products of unsaturated organic compounds containing olefinic linkages.

Although dispersions of resins have been prepared by prior methods using various types of emulsifying agents, very few yield emulsions which have the requisite properties for use in coatings. Some emulsions cannot be satisfactorily pigmented, or do not give mixtures which can be adequately brushed or sprayed on surfaces without premature breaking or clogging of the brush or spray gun.

An object of this invention is to provide resin emulsions suitable for coatings which can be applied by dipping, spreading, calendering, brushing, or spraying.

A further object is to produce emulsions of polymerized acrylic acid, its homologues and derivatives suitable for coatings to be applied by brushing, spraying, dipping or calendering.

A still further object is to provide a process for making emulsions of copolymers of acrylic acid, its homologues, and esters or other derivatives thereof suitable for brushing or spraying or application in some other manner.

Other objects and advantages will be apparent from the following description:

Many dispersing or emulsifying agents which will produce vinyl resin dispersions of satisfactory stability and consistency to be handled, stored, or used to produce the resins by evaporation or precipitation are, nevertheless, unsatisfactory for coating various materials by brushing or spraying. I have found, however, that entirely satisfactory emulsions can be made by the proper choice of emulsifiers, combinations thereof, and other agents and conditions. I have also found that improved resin emulsions result when known emulsifiers are used in combination with natural colloids, such as proteins, alginates, pectin, partially demethylated pectins, starches, starch derivatives, and partially degraded carbohydrates. In one preferred form of my invention, a three-component mixture consisting of emulsifier, colloid, and ammonium hydroxide is used.

In practicing my invention I find it desirable to use a mixture of ingredients to produce dispersions of vinyl resins having suitable stability and consistency for brushing and spraying. There are many methods of preparing emulsions for polymerizations, but I prefer the simple method of adding the monomer or monomer mixture (containing any oil-soluble ingredients) to the water (containing the water-soluble ingredients) and agitating in the vessel to be used for the subsequent polymerization. Low boiling monomers are added under pressure or with cooling after the other ingredients have been charged.

Polymerization is effected by any of the means commonly employed; e. g., light, heat, organic or inorganic peroxides, persulfate, perborates, and so forth. Regulators may be employed, if desired, to control the reaction or to avoid refluxing large amounts of monomer.

So efficient are the mixtures employed that dispersions of great fineness may be obtained in the polymerized form without beating or stirring other than that used during the polymerization. These emulsions are not broken by mechanical action, heating or freezing. The consistency is such that the emulsion sprays well and flows easily from the brush.

My invention is illustrated but not limited by the following examples:

Example I

Ammonium alginate (0.9 part) and 0.9 part of quaternary triethanolamine stearate salt of ethyl sulfuric acid

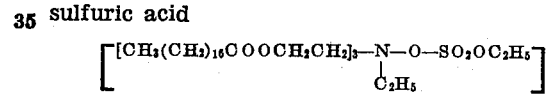

were added with stirring and heating to 60 parts of water and 0.9 part of ammonium hydroxide in a flask until a smooth fluid mixture free of lumps was obtained. The ammonium hydroxide may be present at the beginning or added after the polymerization has been started. To this mixture was added 50 parts of monomeric methyl acrylate. With the addition of 1.0 part of 30 percent hydrogen peroxide and heating to 70–75° C., the polymerization started, and, after continuing for 150 minutes, was complete. During the polymerization, the color changed from tan to white and, upon completion, the emulsion was smooth, white, creamy and very stable. This emulsion was suitable for brushing or spraying and deposited a clear, smooth, flexible film.

Example II

Ammonium alginate (0.7 part) and a sodium sulfate derivative of 7-ethyl-2-methylundecanol-4, represented by the formula:

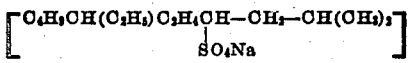

(0.9 part) were added with stirring to 55 parts of water and 0.3 part of ammonium hydroxide as described in Example I. To this mixture was added 45 parts of monomeric methyl acrylate and 0.5 part of 30 percent hydrogen peroxide and the polymerization carried out as in the preceding example, being completed in 110 minutes. The emulsion produced was smooth, white, creamy, and stable. It was suitable for brushing or spraying. The film deposited from this emulsion was clear, tough, smooth, and flexible.

Example III

Ammonium alginate (0.5 part) and 0.9 part of 75% sulfonated castor oil were added with stirring to 50 parts of water as described above. To this mixture was added 45 parts of monomeric methyl acrylate and 1.0 part of hydrogen peroxide and the polymerization carried out as in the preceding examples, being completed in 150 minutes. The emulsion was smooth, white, thick, creamy, and stable. Films made from it were clear, smooth, strong, and flexible.

Example IV

Quaternary triethanolamine stearate salt of ethyl sulfuric acid (8.0 parts) was dissolved by heating and stirring in 400 parts of water. To this was added 100 parts of solution containing 6.0 parts of ammonium hydroxide. The reaction product was a light-colored precipitate which was dissolved by additional heating and stirring. 8.0 parts of ammonium alginate were added. After a smooth, homogeneous mixture had been obtained, a mixture of 450 parts of methyl acrylate and 50 parts of acrylonitrile monomer was added. Polymerization was induced by the addition of 1.2 parts of 30 percent hydrogen peroxide and heating for 90 minutes. The finished emulsion was smooth, white, creamy, and stable; films made from it were clear, tough, flexible, and strong.

Example V

A solution containing 50 parts of water, 0.9 part of cetyl dimethyl benzyl ammonium chloride and 0.8 part of ammonium alginate was made. To the mixture was added 45 parts of monomeric methyl acrylate and polymerization induced by the addition of 0.5 part of benzoyl peroxide and heating for 45 minutes. After the polymerization was completed, a white, creamy emulsion was obtained which deposited a smooth, clear film.

Example VI

To a solution of 1.0 part of quaternary triethanolamine stearate salt of ethyl sulfuric acid in 70 parts of water was added 12 parts of a solution of 6 percent ammonium hydroxide. After solution had occurred, 1.0 part of partially demethylated pectin was added and a smooth solution obtained. Then 50 parts of monomeric methyl acrylate was added and polymerization was induced by adding 0.5 part of hydrogen peroxide and heating. The resulting emulsion was smooth and free of lumps and yielded a smooth, clear film on evaporation.

Example VII

To 280 parts of water was added 12 parts of peptized casein and 4 parts of sodium sulfate derivative of 7-ethyl-2-methylundecanol-4, and the mixture was heated and stirred until a smooth liquid was obtained. To this mixture was added 225 parts of monomeric methyl acrylate. Polymerization was induced by adding 0.2 ml. of 30 percent hydrogen peroxide and heating for 50 minutes when the polymerization was complete. The emulsion was white. Upon evaporation, a tough, smooth, slightly cloudy film was obtained which adhered to glass with unusual tenacity.

Example VIII

To 70 parts of water were added 1.0 part of the dioctyl ester of sodium sulfosuccinic acid and 2.5 parts of peptized casein, and the mixture was stirred until a solution resulted. To this mixture was added 50 parts of monomeric methyl acrylate and polymerization was induced by adding 0.05 part of 30 percent hydrogen peroxide and heating for 30 minutes. The emulsion produced was white, creamy, stable, and made a tough, smooth, clear film when evaporated.

Example IX

To 250 parts of water was added 7.5 parts of 20 percent ammonium polyacrylate and 250 parts of monomeric methyl acrylate. The addition of 4.5 parts of 27½ percent hydrogen peroxide with heating caused polymerization. The resulting emulsion was thick, creamy, and stable to mechanical action. The film produced was clear and tough.

Example X

To 225 parts of water was added 1.0 part of partially demethylated pectin and 1.5 parts of ammonium hydroxide and stirred. To this was added, while stirring, a warmed solution of 150 parts of monomeric methyl acrylate and 1.5 parts of ursolic acid. The addition of 13 parts of 27½ percent hydrogen peroxide with heating caused polymerization and yielded an emulsion of polymethyl acrylate in water. The emulsion was smooth, creamy, and stable to mechanical action. The deposited film was clear and tough.

The quaternary triethanolamine stearate salt of ethyl sulfuric acid is a typical quaternary ammonium salt emulsifier. Such quaternary salts are commonly prepared by quaternizing a tertiary amine by reacting it with diethyl sulfate. See, for instance, Examples 5 and 6 of Piggott et al. U. S. Patent 2,202,864. The triethanolamine esters of higher fatty acids, in which the three hydroxyl groups of triethanolamine are esterified with acids such as stearic, are known compounds, see U. S. Kritchevsky Patent 2,173,058.

Having thus described my invention, I claim:

1. A process for producing a stable aqueous resin dispersion suitable for brushing, spraying, dipping, or calendering, comprising: homo-polymerizing monomeric methyl acrylate by heating it in aqueous medium in the presence of a synthetic ionic surface-active wetting and emulsifying agent therefor; a peroxide polymerizing catalyst; ammonia; and colloid consisting of ammonium alginate; to form a smooth, creamy, stable emulsion.

2. A process for producing an aqueous resin dispersion suitable for brushing, spraying, dipping, or calendering, comprising: homo-polymerizing a monomeric lower alkyl acrylate by heating it in aqueous medium in the presence of a synthetic ionic surface-active wetting and emulsifying agent; a peroxide polymerization catalyst; ammonia; and colloid consisting of ammonium alginate, to form a smooth, creamy, stable emulsion.

3. The process of claim 2 in which acrylonitrile is mixed with lower alkyl acrylate.

4. A process for producing a stable aqueous resin dispersion suitable for brushing, spraying, dipping, or calendering, comprising: polymerizing a polymerizable material of the group consisting of monomeric lower alkyl acrylate alone and a mixture consisting of monomeric lower alkyl acrylate and acrylonitrile, by heating it in aqueous medium in the presence of a synthetic ionic surface-active wetting and emulsifying agent therefor; a peroxide polymerizing catalyst; ammonia; and colloid consisting of ammonium alginate; to form a smooth, creamy, stable emulsion.

WILLIAM C. MAST.

REFERENCES CITED

The following references are of record in the file of this patent:

UNITED STATES PATENTS

| Number | Name | Date |
|---|---|---|
| 2,097,212 | Healey | Oct. 26, 1937 |
| 2,123,599 | Fikentscher et al. | July 12, 1938 |
| 2,191,654 | Haon | Feb. 27, 1940 |
| 2,388,600 | Collins | Nov. 6, 1945 |
| 2,393,438 | Weisberg | Jan. 22, 1946 |
| 2,410,089 | Lundquist et al. | Oct. 29, 1946 |

OTHER REFERENCES

Ind. & Eng. Chem., vol. 35, Jan. 1943, pages 126 to 130.